B. J. DRYER.
SHOCK ABSORBER.
APPLICATION FILED FEB. 19, 1914. RENEWED DEC. 18, 1915.
1,169,624. Patented Jan. 25, 1916.
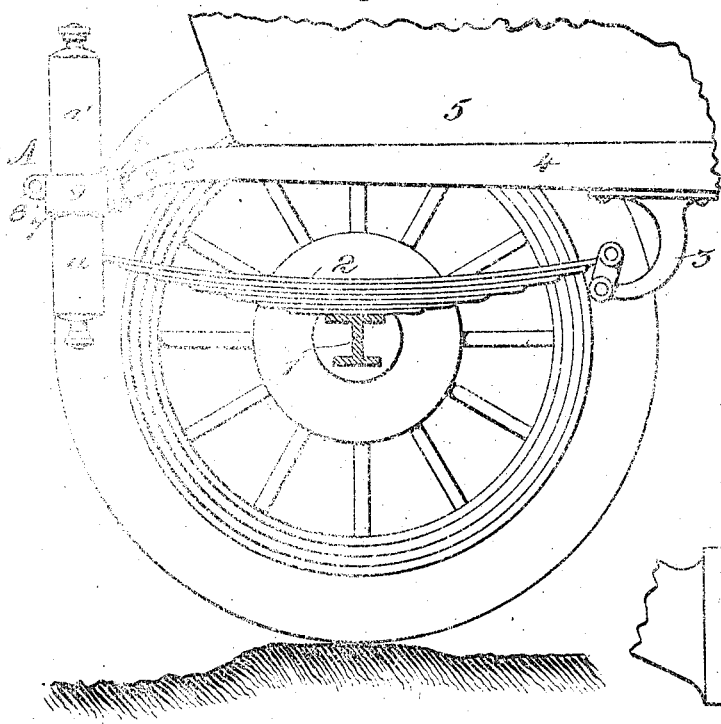
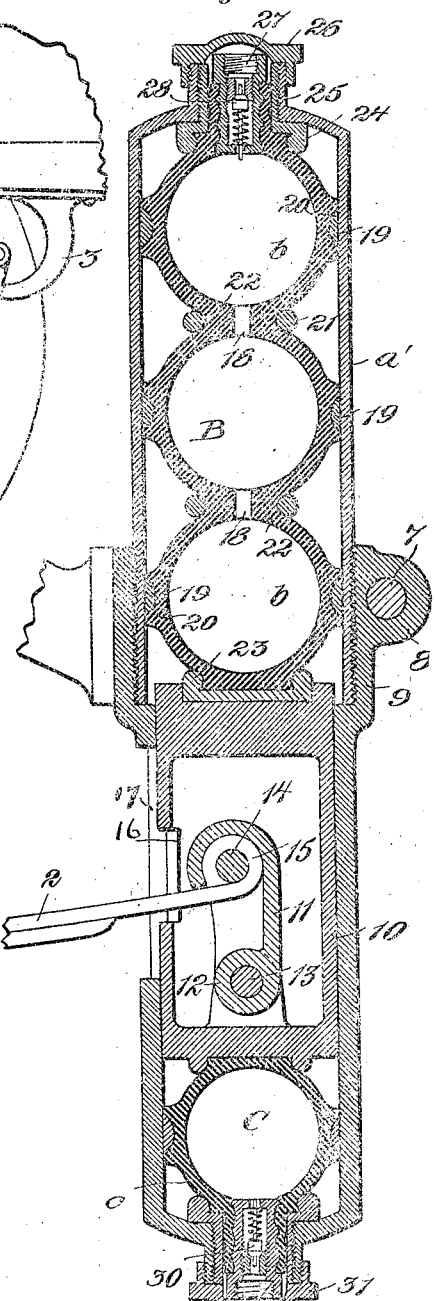
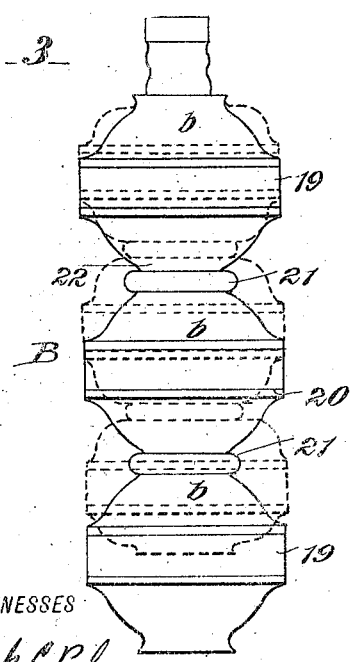
WITNESSES
Frank C. Palmer
C. Bradway
INVENTOR
Benjamin J. Dryer
BY
ATTORNEYS

UNITED STATES PATENT OFFICE.

BENJAMIN JAMES DRYER, OF NEW YORK, N. Y.

SHOCK-ABSORBER.

1,169,624.         Specification of Letters Patent.         Patented Jan. 25, 1916.

Application filed February 19, 1914, Serial No. 819,727. Renewed December 18, 1915. Serial No. 67,630.

*To all whom it may concern:*

Be it known that I, BENJAMIN J. DRYER, a citizen of the United States, and a resident of the city of New York, borough of Manhattan, in the county and State of New York, have invented a new and Improved Shock-Absorber, of which the following is a full, clear, and exact description.

This invention relates to a shock absorber or cushioning device of the compressed-air type and is adapted to be used in a supplementary capacity to the usual suspension springs of vehicles by being interposed between and connected with such springs and the vehicle body so as to cushion both the downward and rebound movements of the body.

The invention has for its general objects to improve and simplify the construction and operation of air cushioning devices or shock absorbers so as to be reliable and efficient in use, comparatively inexpensive to manufacture, install and keep in operative condition, of a neat and pleasing appearance, and capable of being inflated to varying degrees according to the load imposed upon the vehicle.

Another object of the invention is the provision of a novel, simple and efficient cushioning device which embodies a movable element that is shackled or otherwise connected with the vehicle spring and has air cushioning elements above and below the same for absorbing the shocks or jolts which would otherwise be imparted to the vehicle body due to obstructions, depressions and unevennesses in the road surface.

Another object of the invention is the provision of an improved cushioning element which is capable of vertical compression within a cylindrical or other guide without a frictional engagement or binding with such guide.

An additional object of the invention is the production of a multi-cellular longitudinally-compressible air-containing cushioning element having novel means for preventing lateral expansion so that said element can be mounted within a tubular guide or housing and be freely compressed or expanded without binding in the latter.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a sectional view of the rear axle of an automobile, showing the cushioning device or shock absorber in elevation and connected with the axle spring and body; Fig. 2 is an enlarged longitudinal section of the shock absorber; and Fig. 3 is a side view of the upper cushioning element or cellular structure, showing the same in normal condition by full lines and in compressed condition by dotted lines.

In the present instance the cushioning device or shock absorber A is shown applied to one of the springs of a vehicle, but it is to be understood that there will be shock absorbers at all four springs, or at least at the rear springs, so that the shock absorbers will act in a supplementary capacity to the usual steel leaf springs.

1 designates the rear axle on which the semi-elliptical spring 2 is mounted in the usual manner, having the usual connection 3 at its front end, with the frame 4 for the body 5; and the rear end of the spring 2 is connected with the shock absorber, which latter is also connected with a bracket 6 on the vehicle frame. The shock absorber A is a vertically disposed tubular structure which is fastened adjacent its middle with the vehicle frame, and the corresponding shock absorbers at the right and left of the vehicle may be connected together by a horizontal rod 7 having each end fastened in a lug 8 on the body of the shock absorber.

The shock absorber comprises a lower section $a$ and an upper section $a'$, which are both preferably, although not necessarily, of cylindrical form and suitably connected together, as, for instance, by the section $a'$ screwing into the upper enlarged portion 9 of the section $a$. Slidable in the section or cylinder $a$ is a vertically reciprocating plunger 10 which is chambered and contains a shackle 11 which has its lower end 12 fastened on a pivot 13, while the upper end of the shackle is connected by a pivot or pin 14 with the eye 15 on the outer extremity of the vehicle spring 2, such spring extending through registering openings 16 and 17 in the piston 10 and cylinder a, these openings being just large enough to provide for the necessary play of the moving parts and to enable the lower end of the shackle to be pulled out far enough to enable the spring to be connected or disconnected. Cushioning elements B and C are disposed respectively above and below the piston 10, the upper cushioning element having a greater range of action than the lower because it must withstand the downward movements of the vehicle body, while the lower cushioning element withstands the upper or rebound movements.

The cushioning element B comprises a compressed-air-containing cellular structure which occupies the upper section a' of the body or casing of the shock absorber, and this cellular structure is preferably, although not necessarily, made of rubber or other suitable material in the form of a plurality of balls b integrally or otherwise connected together and intercommunicating through passages 18, so that the air pressure will be uniform in all the balls.

It is necessary to prevent the balls b from expanding horizontally when they are subjected to compression by the upward movement of the piston 10, for such horizontal expansion would cause frictional engagement with the housing a' in which they are located, whereby compression would be resisted. For this purpose the equatorial zone of each ball is surrounded by a metallic or other non-expanding ring 19 retained in a groove 20 surrounding the ball. This ring 19 is of such diameter that it will slide longitudinally of the housing a' without binding. The necks 22 between adjacent balls are surrounded by non-expansible rings 21 so as to prevent lateral expansion of the necks. By this means the balls are prevented from expanding both at their poles and equators, so to speak, and consequently they can yield when compressed only at the portions intermediate these zones. This is clearly brought out in Fig. 3, in which the full lines indicate the balls when in normal condition, while the dotted lines represent the balls somewhat compressed. The lower ball is fitted to a seat 23, while the upper ball is fitted to a seat 24 which is screwed or otherwise fastened in the tubular extension 25 of the casing a', such extension being provided with a removable cap 26 to permit an air supply pump or equivalent means to be connected with the inflating valve nipple 27 which is fastened to the upper ball. The air is compressed in the balls to the desired pressure and is automatically retained by the seat of the inflating valve 28, and after once inflated, the pressure will be maintained indefinitely. The rebound cushioning element C is shown as a single ball c, but any number of balls may be employed, their construction being similar to the balls b in the upper cushioning element. An inflating nipple 29 and valve 30 are provided with balls c, and a removable cap 31 applied to the lower end of the casing protects the said nipple. When the body rebounds or moves upwardly the casing of the shock absorber moves upwardly therewith, while the piston 10 is relatively stationary, and as a result the cushioning element C is compressed, and in so doing it absorbs the shock. By reason of the cushioning elements of the shock absorber the range of flexibility of the resilient suspension means between the axle and body is greatly increased, and the up and down movements of the body are retarded with a progressively increasing resistance which is conducive to the maximum smoothness and comfort of running. The shock absorbers require no attention except for occasional inflation, and they can be applied to an automobile at relatively little expense as compared with other air cushioning devices used.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made when desired as are within the scope of the appended claims.

Having thus described my invention, I claim as new and desire to secure by Letters Patent:

1. A shock absorber comprising relatively movable parts, a compressible cushioning element disposed between and yieldingly opposing the relative movement of the said parts, one of said parts forming a guide for the cushioning element, and means for preventing the cushioning element from expanding into frictional engagement with the guide.

2. A shock absorber comprising relatively movable parts, a compressible cushioning element disposed between and yieldingly opposing the relative movement of the said parts, one of said parts forming a guide for the cushioning element, said element consisting of a plurality of resilient bodies disposed in a line, and a member surrounding each of the bodies of the said element and slidable in the guide for preventing the element from expanding into frictional engagement with the guide.

3. A shock absorber comprising a pneumatic flexible-walled body, a guide in which said body is held, a valve whereby said body may be inflated, and means surrounding said body and preventing its expansion against the guide.

4. A shock absorber comprising a plunger and a casing, respectively connected to relatively movable parts of a vehicle, a pneumatic cushioning-element having a flexible wall, in said casing, and means surrounding said element and preventing its expansion against the casing.

5. A shock absorber comprising a plunger and a casing, respectively connected to relatively movable parts of a vehicle, a pneumatic cushioning element having a flexible wall, in said casing, a ring surrounding said element and preventing its expansion into engagement with the casing, and means permitting inflation of said body.

6. A shock absorber comprising a casing and a plunger connected to relatively movable parts of a vehicle respectively, a multicellular flexible-walled cushioning-element between the plunger and the casing, a valve whereby said element may be inflated, and means for preventing expansion of the element into engagement with the casing.

7. A shock absorber comprising a guide and a plunger connected to relatively movable parts of a vehicle respectively, a multicellular elastic-walled cushioning body between the top of the plunger and the guide, an elastic-walled cushioning body between the bottom of the plunger and the guide, means for preventing expansion of said bodies against the guide, and valves permitting said bodies to be inflated.

In testimony whereof I have signed my name to this specification in the presence of two subscribing witnesses.

BENJAMIN JAMES DRYER.

Witnesses:
CHAS. D. STEFFENS,
GEORGE WALZ.